(12) United States Patent
Kasai

(10) Patent No.: US 7,599,107 B2
(45) Date of Patent: Oct. 6, 2009

(54) ELECTRO-OPTICAL DEVICE, ELECTRONIC APPARATUS, AND DRIVING METHOD

(75) Inventor: Toshiyuki Kasai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 254 days.

(21) Appl. No.: 11/678,800

(22) Filed: Feb. 26, 2007

(65) Prior Publication Data

US 2007/0195157 A1   Aug. 23, 2007

(30) Foreign Application Priority Data

Mar. 20, 2006   (JP)   ............................. 2006-076397

(51) Int. Cl.
G02F 1/03 (2006.01)
G09G 3/30 (2006.01)
G09G 3/32 (2006.01)
G09G 3/10 (2006.01)

(52) U.S. Cl. ..................... 359/245; 359/264; 345/76; 345/82; 345/204; 345/205; 345/211; 315/169.3; 315/291

(58) Field of Classification Search ................. 359/245, 359/264, 634; 250/214.1, 214 R; 347/253; 345/55, 76–78, 82, 89, 147, 204, 205, 211, 345/690, 83; 315/105, 125, 149, 150, 156, 315/169.3, 291; 323/282

See application file for complete search history.

(56) References Cited

U.S. PATENT DOCUMENTS

| | | | | |
|---|---|---|---|---|
| 4,523,089 A * | 6/1985 | Maeda et al. | ................ | 250/205 |
| 4,559,480 A * | 12/1985 | Nobs | .......................... | 315/324 |
| 6,020,865 A * | 2/2000 | Okuda et al. | ................... | 345/82 |
| 6,518,962 B2 * | 2/2003 | Kimura et al. | .............. | 345/211 |
| 6,710,548 B2 * | 3/2004 | Kimura | ................... | 315/169.3 |
| 6,788,003 B2 * | 9/2004 | Inukai et al. | ............. | 315/169.3 |
| 7,042,427 B2 * | 5/2006 | Inukai | .......................... | 345/77 |
| 7,236,149 B2 * | 6/2007 | Yamashita et al. | ............. | 345/76 |
| 7,245,277 B2 * | 7/2007 | Ishizuka | ....................... | 345/78 |
| 7,307,607 B2 * | 12/2007 | Osame et al. | ................. | 345/77 |
| 7,321,350 B2 * | 1/2008 | Lee et al. | ....................... | 345/89 |
| 7,362,322 B2 * | 4/2008 | Kimura et al. | .............. | 345/211 |
| 7,463,254 B2 * | 12/2008 | Shino et al. | ................. | 345/204 |

(Continued)

FOREIGN PATENT DOCUMENTS

JP   A-01-160659   6/1989

(Continued)

*Primary Examiner*—Loha Ben
(74) *Attorney, Agent, or Firm*—Oliff & Berridge, PLC

(57) ABSTRACT

An electro-optical device includes a controller, a reference current source, a correction current source, a combining unit, and an electro-optical element. The controller generates a reference current control signal defining a first period during which a reference current is output, and a correction current control signal defining a second period during which a correction current is output, the second period being shorter than the first period. The reference current source generates the reference current based on the reference current control signal. The correction current source generates the correction current based on the correction current control signal. The combining unit combines the reference current and the correction current to generate a driving current. The electro-optical element emits an amount of light corresponding to the driving current. The controller generates the reference current control signal and the correction current control signal so that the second period is shorter than the first period.

15 Claims, 11 Drawing Sheets

U.S. PATENT DOCUMENTS

| | | | | |
|---|---|---|---|---|
| 2003/0016198 A1* | 1/2003 | Nagai et al. | ................... | 345/83 |
| 2004/0046720 A1* | 3/2004 | Nagai et al. | ................... | 345/82 |
| 2006/0267884 A1* | 11/2006 | Takahashi et al. | ............. | 345/76 |
| 2007/0152920 A1* | 7/2007 | Yamashita et al. | ............ | 345/76 |
| 2007/0262934 A1* | 11/2007 | Fujikawa et al. | .............. | 345/82 |

FOREIGN PATENT DOCUMENTS

| | | |
|---|---|---|
| JP | A-07-047712 | 2/1995 |
| JP | A 8-39862 | 2/1996 |
| JP | A-10-235929 | 9/1998 |
| JP | A-11-221939 | 8/1999 |

* cited by examiner ed within the first period. In a case where the correction
ELECTRO-OPTICAL DEVICE, ELECTRONIC APPARATUS, AND DRIVING METHOD This application claims the benefit of Japanese Patent Application No. 2006-076397, filed in the Japanese Patent Office on Mar. 20, 2006. The entire disclosure of the prior application is hereby incorporated by reference herein in its entirety.

BACKGROUND

1. Technical Field

The present invention relates to electro-optical devices including electro-optical elements, electronic apparatuses, and driving methods.

2. Related Art

A printer serving as an image forming apparatus includes a lighting device having multiple light-emitting elements arranged in an array, and the lighting device is used as a head unit for forming an electrostatic latent image onto an image carrier such as a photoreceptor drum. The head unit is generally formed of a single line having a plurality of light-emitting elements arranged in a main scanning direction. One known light-emitting element is a light emitting diode such as an organic light emitting diode (OLED) element.

JP-A-8-39862 (see FIG. 6) discloses a technique in, which a pulse width signal having a pulse width corresponding to a density data signal is generated and a driving current corresponding to correction data is supplied to light emitting diodes for a period of time corresponding to the pulse width of the pulse width signal. As shown in FIG. 11, a driving current is given by the sum of a reference current and a correction currents and gradation control is performed according to a pulse width T of the driving current.

The correction current is a current for correcting variations in threshold voltages of driving transistors or variations in light emitting characteristics of light emitting diodes, and is generally within a few percent of a reference current. Thus, the magnitude of the correction current is significantly smaller than the magnitude of the reference current. In general, it is difficult to realize a circuit capable of generating a small current with high accuracy. Even though such a circuit can be realized, there is a problem of increased circuit size.

SUMMARY

Some embodiments of the invention include providing an electro-optical device capable of generating a correction current with high accuracy using a simple circuit an electronic apparatus including the electro-optical device, and a driving method for the electro-optical device.

In some embodiments, there is provided an electro-optical device including a controller that generates a reference current control signal defining a first period during which a reference current is output, and a correction current control signal defining a second period during which a correction current is output; a reference current source that generates the reference current on the basis of the reference current control signal; a correction current source that generates the correction current on the basis of the correction current control signal; a combining unit that combines the reference current and the correction current to generate a driving current, and an electro-optical element that emits an amount of light corresponding to the driving current, wherein the controller generates the reference current control signal and the correction current control signal so that the second period is shorter than the first period.

In some embodiments, a first period during which a reference current is enabled and a second period during which a correction current is enabled are defined by individual control signals. Thus, the first period and the second period can be individually defined. In addition, since the second period is shorter than the first period, the magnitude of the correction current can be increased compared with a case where a period during which the reference current is supplied and a period during which the correction current is supplied are not individually designated. Therefore, gradation correction for the electro-optical element can be performed with high accuracy. In general, the circuit size of the correction current source needs to increase to generate a small correction current. According to an exemplary embodiment of the invention, on the other hand, since the magnitude of the correction current can be large, the circuit size of the correction current source can be reduced. The electro-optical element can be implemented by any of electro-optical elements whose optical characteristics are changed by electrical energy. Such electro-optical elements include light emitting diodes such as organic electroluminescent (EL) light emitting diodes and inorganic EL light emitting diodes, and current-driven light emitting elements driven by a current.

It is preferable that the controller has a function for performing gradation control on the electro-optical element on the basis of pulse-width modulation, and generates the reference current control signal so that the first period has a length corresponding to a pulse width in the pulse-width modulation. In this case, the reference current is a pulse-width-modulated signal, and gradation is represented according to the pulse width of the pulse-width-modulated signal.

It is preferable that the correction current source includes a digital-to-analog converter that performs digital-to-analog conversion on correction data indicating a magnitude of the correction current to generate the correction current. The correction current source may further include a storage unit that stores the correction data, and the correction data read from the storage unit may be subjected to digital-to-analog conversion to generate the correction current. In this case, light emitting characteristics of the electro-optical element may be measured in advance, and correction data may be generated in advance so that the electro-optical element can achieve desired display gradation according to the measured characteristics and may be stored in the storage unit. Alternatively, the light emitting characteristics of the electro-optical element may be measured whenever the electro-optical device is used, and the correction data generated according to the measured characteristics may be stored in the storage unit.

It is preferable that the controller generates the reference current control signal and the correction current control signal so that the second period is included once or a plurality of times within the first period. In a case where the correction current is generated only once, the beginning of the first period and the beginning of the second period may coincide with each other. In this case, the driving current can rapidly rise, and a delay in the light emission period of the electro-optical element can be improved even if a line extending from the output port of the combining unit to the electro-optical element is long and is a captive load.

It is preferable that the controller adjusts the length of the second period according to the length of the first period. In this case, the amount of correction made by the correction current can be changed in association with the gradation to be displayed. As a result, if the amount of correction changes according to the gradation, high-accuracy correction can be realized.

It is also preferable that the magnitude of the correction current is determined according to the length of the first period. Also in this case, the amount of correction made by the correction current can be changed in association with the gradation to be displayed.

It is preferable that gradation data indicating the amount of light emitted from the electro-optical element is formed of a plurality of bits, and the controller includes a correction reference signal generator that generates a correction reference signal that is enabled at intervals of a time period corresponding to a least significant bit of the gradation data, and a logical circuit (for example, a NOR circuit 26 and an inverter 27 according to an embodiment) that determines a logical product of the correction reference signal and the reference current control signal and that generates the correction current control signal on the basis of the determined logical product.

In this case, the correction reference signal is enabled at intervals of a time period corresponding to a least significant bit of the gradation data, and the reference current control signal is enabled for a period corresponding to the value of the gradation data. The correction current control signal is thus enabled at intervals of the the period corresponding to the least significant bit. Therefore, the length of the second period can be adjusted according to the length of the first period. As a result, the amount of correction made by the correction current can be changed in association with the gradation to be displayed.

More specifically, a timing at which the correction current is started to be supplied to the electro-optical element may coincide with a timing at which the reference current is started to be supplied to the electro-optical element. Alternatively, a timing of a center of a period during which the correction current is supplied to the electro-optical element may coincide with a timing of a center of a period during which the reference current is supplied.

In some embodiments, there is provided an electronic apparatus including the above-described electro-optical device. Examples of the electronic apparatus include image forming apparatuses such as a printer, a copying machine, and a facsimile machine, and other electronic apparatuses such as a display, a personal computer, a mobile phone, a digital still camera, and a video camera.

According to some embodiments of the invention, there is provided a method for driving an electro-optical element that emits an amount of light corresponding to a driving current. The method includes generating a reference current control signal defining a first period during which a reference current is output and a correction current control signal defining a second period during which a correction current is output so that the second period is included within the first period; generating the reference current on the basis of the reference current control signal; generating the correction current on the basis of the correction current control signal; and combining the reference current and the correction current to generate the driving current and supplying the driving current to the electro-optical element.

According to some embodiments, the magnitude of the correction current can be increased compared with a case where a period during which the reference current is supplied and a period during which the correction current is supplied are not individually designated. Therefore, gradation correction for the electro-optical element can be performed with high accuracy. In general, the circuit size of the correction current source needs to increase to generate a small correction current. According to an exemplary embodiment of the invention, on the other hand, since the magnitude of the correction current can be large, the circuit size of the correction current source can be reduced.

BRIEF DESCRIPTION OF THE DRAWINGS

Exemplary embodiments will be described with reference to the accompanying drawings, wherein like numbers reference like elements.

DESCRIPTION OF EXEMPLARY EMBODIMENTS

Figure 1:
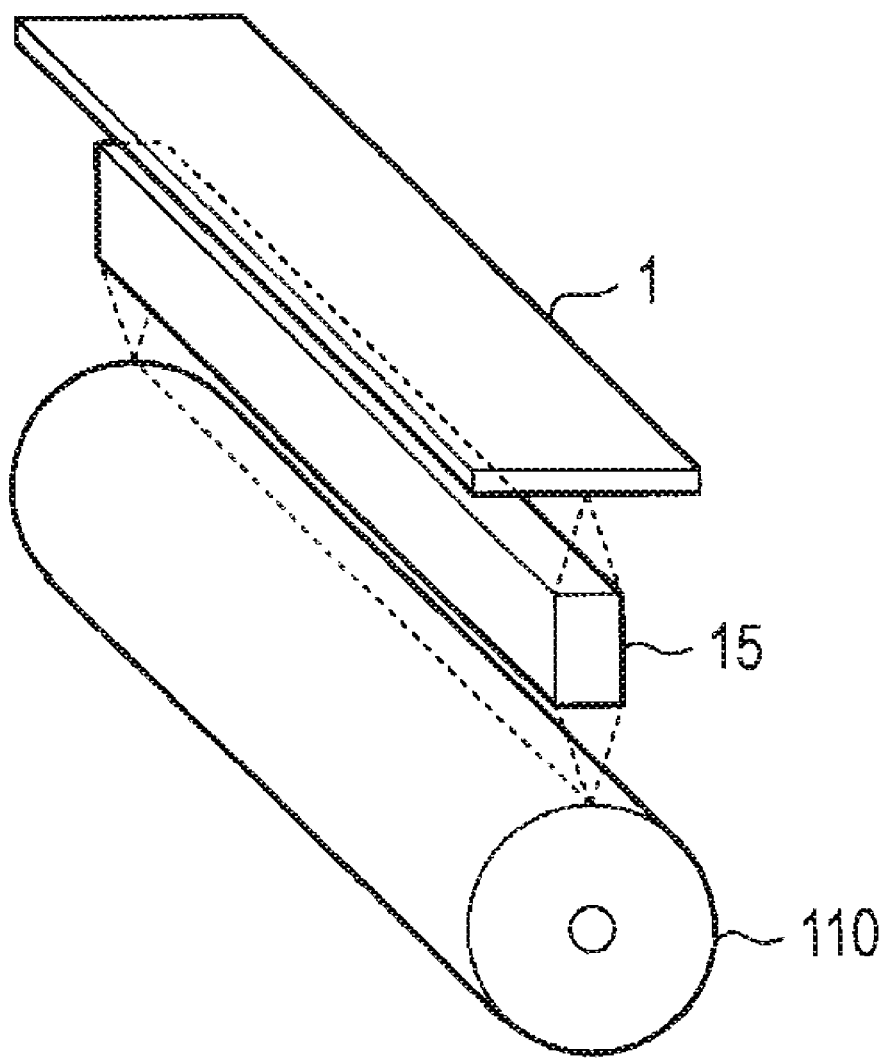
FIG. 1 is a partial perspective view showing the structure of an image forming apparatus including an optical head 1.

Exemplary embodiments will be described with reference to the drawings. In the drawings, common elements are denoted by the same reference numerals.

First Embodiment

FIG. 1 is a partial perspective view showing the structure of an image forming apparatus using an optical head according to a first embodiment of the invention. As shown in FIG. 1, the image forming apparatus includes an optical head 1, an optical fiber lens array 15, and a photorecepter drum 110. The optical head 1 has multiple light emitting elements arranged in an array. The light emitting elements selectively emit light according to an image to be printed on a recording medium such as a sheet of paper. For example, the light emitting elements are organic light emitting diode elements (hereinafter referred to as "OLED elements"). The optical fiber lens array 15 is disposed between the optical head 1 and the photorecepter drum 110. The optical fiber lens array 15 includes multiple gradient index lenses that are arranged in an array so that the optical axes of the lenses are directed toward the optical head 1. The light emitted from the light emitting elements of the optical head 1 is transmitted through the gradient index lenses of the optical fiber lens array 15, and reaches a surface of the photorecepter drum 110. The surface of the photorecepter drum 110 is exposed to light, thereby forming a latent image corresponding to a desired image on the surface of the photorecepter drum 110.

Figure 2:
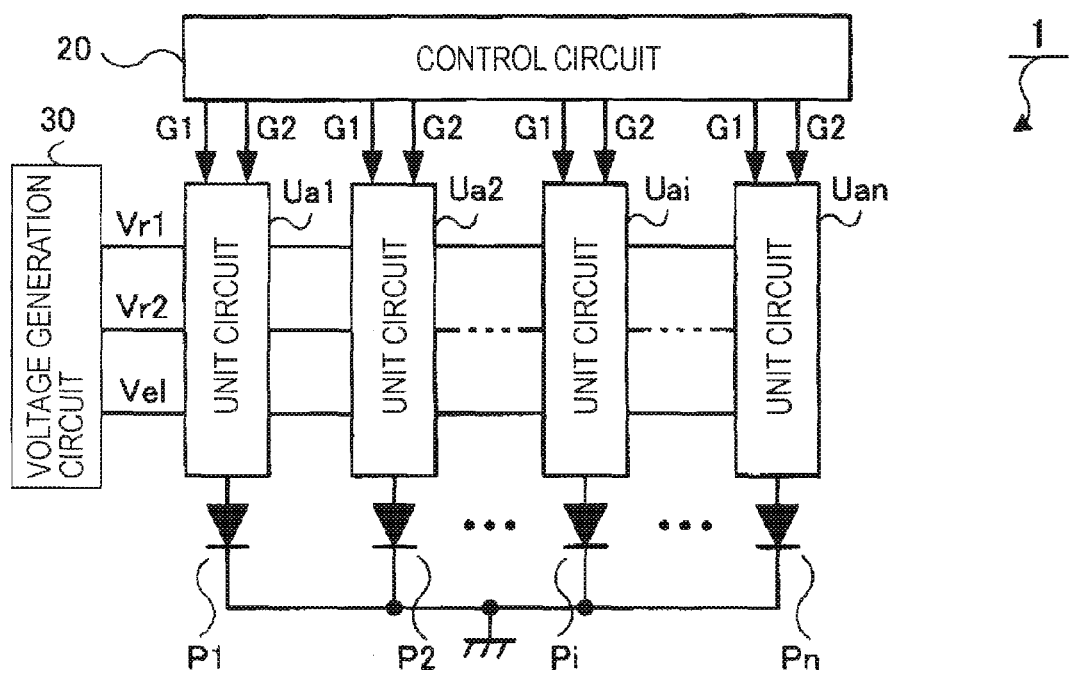
FIG. 2 is a block diagram showing the structure of the optical head 1.

FIG. 2 is a block diagram showing the structure of the optical head 1. The optical head 1 includes n OLED elements P1 to Pn, and n unit circuits Ua1 to Uan corresponding to the OLED elements P1 to Pn, respectively. The i-th unit circuit Uai (where i is a natural number satisfying $1 \leq i \leq n$) combines a pulse-width-modulated reference current and a correction current to generate a driving current, and supplies the driving current to the OLED element Pi. A control circuit 20 generates a reference current control signal G1 defining a first period during which the reference current is supplied to the OLED elements P1 to Pn, and a correction current control signal G2 defining a second period during which the correction current is supplied to the OLED elements P1 to Pn, and supplies the control signals G1 and G2 to the unit circuits Ua1 to Uan. A voltage generation circuit 30 generates a power supply voltage Ve1, a first reference voltage Vr1, and a second reference voltage Vr2, and supplies the voltages Ve1, Vr1, and Vr2 to the unit circuits Ua1 to Uan. The first reference voltage Vr1 defines the magnitude of the reference current, and the second reference voltage Vr2 defines the magnitude of the correction current. The first and second reference voltages Vr1 and Vr2 may or may not have the same value.

Figure 3:
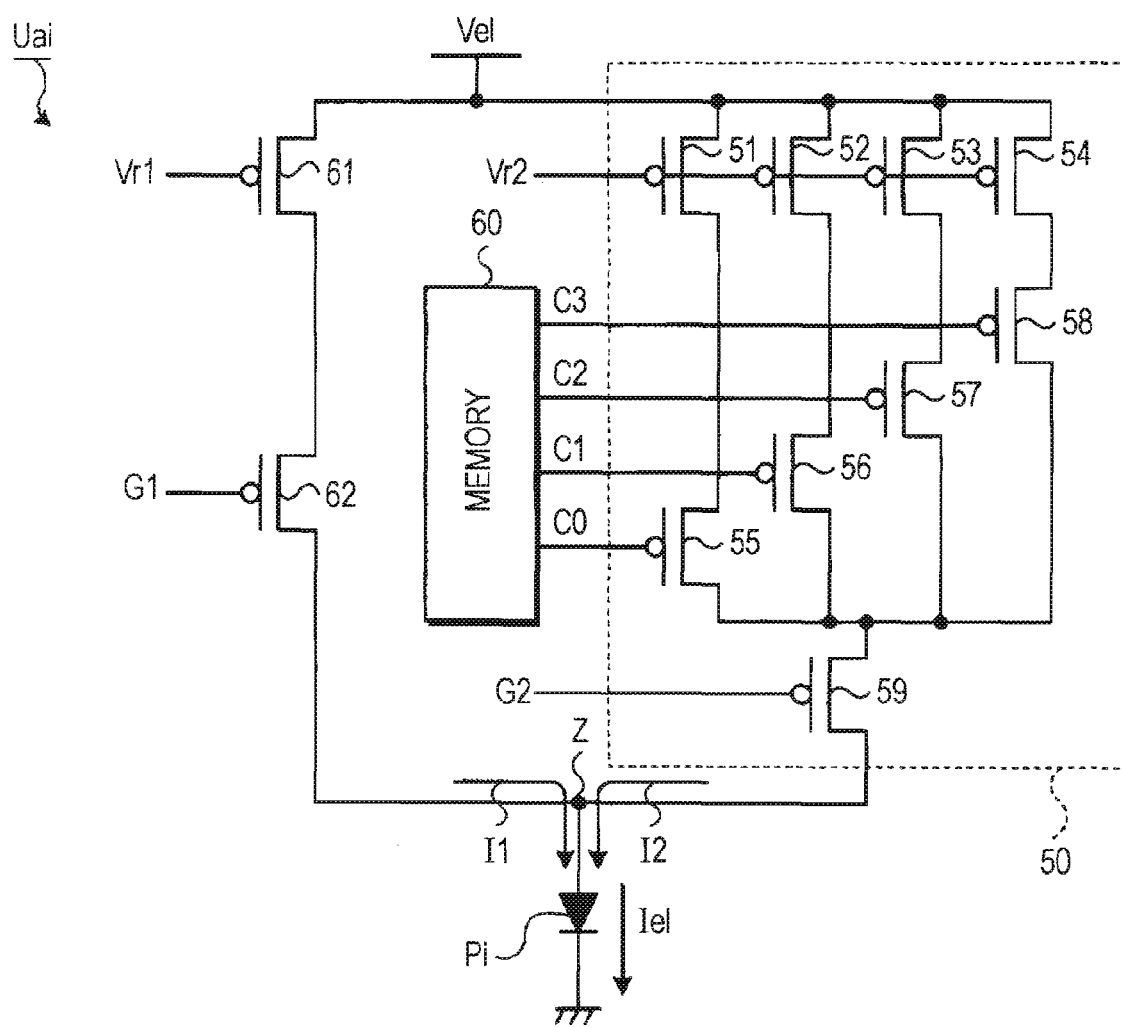
FIG. 3 is a circuit diagram showing the structure of a unit circuit Uai.

FIG. 3 is a circuit diagram showing the i-th unit circuit Uai. The unit circuit Uai includes a digital-to-analog (DA) converter 50, a memory 60, a driving transistor 61, and a first transistor 62. The driving transistor 61 basically operates in a saturation region, and functions as a current source that outputs a current corresponding to a voltage between a gate and source of the driving transistor 61 as a reference current I1. The voltage at the source of the driving transistor 61 is fixed to a power supply voltage Ve1, and the magnitude of the reference current I1 is determined by the first reference voltage Vr1. The first transistor 62 functions as a switching element that is controlled by the reference current control signal G1 to be turned on or off. When the first transistor 62 is turned on, the reference current I1 is output to a node Z, whereas when the first transistor 62 is turned off, the supply of the reference current I1 is stopped. As discussed below, the pulse width of the reference current control signal G1 is determined according to the amount of light emitted from the OLED element Pi (i.e., the gradation). Therefore, a signal obtained by pulse-width-modulating the reference current I1 is supplied to the OLED element Pi.

At the node Z, the reference current I1 and a correction current I2 are combined to generate a driving current Ie1. The driving current Ie1 is supplied to the OLED element Pi. In this example, the magnitude of the correction current I2 is controlled by four-bit correction data. The correction data may be determined in advance so that, for example, when only the reference current I1 is supplied to the OLED element Pi as the driving current Ie1 and the brightness of the OLED element Pi is measured, the measured brightness has a desired value. The memory 60 is a non-volatile memory that stores in advance the four-bit correction data. The memory 60 may be a volatile memory to which the correction data is written when the power of the optical head 1 is turned on. In this case, the correction data may be modified over time.

The DA converter 50 includes transistors 51 to 54 serving as current sources, transistors 55 to 58 serving as switching elements, and a second transistor 59. In this example, the transistors 51, 52, 53, and 54 are designed so that the sizes of the transistors 51, 52, 53, and 54 have a ratio of 1:2:4:8. However, the ratio of the sizes is arbitrary. The four bits C0 to C3 of the correction data are supplied to the transistors 55 to 58, respectively. Thus, the correction current I2 whose magnitude corresponds to the value of the correction data is generated. The second transistor 59 functions as a switching element that is controlled by the correction current control signal G2 to be turned on or off. When the second transistor 59 is turned on, the correction current I2 is output to the node Z, whereas when the second transistor 59 is turned off, the supply of the correction current I2 is stopped.

Figure 4:
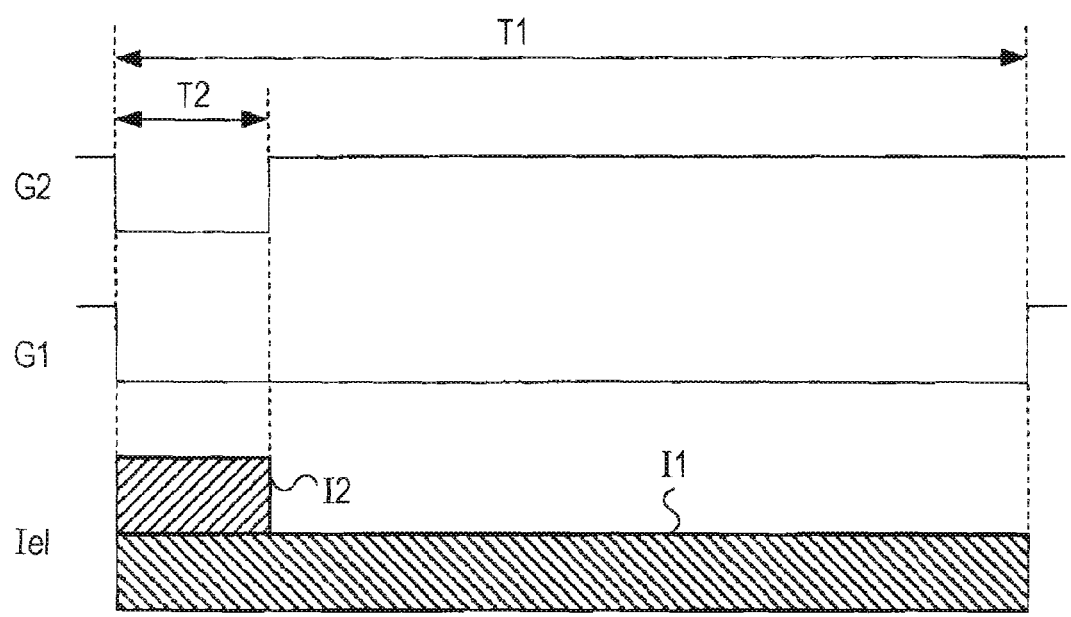
FIG. 4 is a timing chart showing the relationship among a reference current control signal G1, a correction current control signal G2, and a driving current Ie1.
Figure 11:
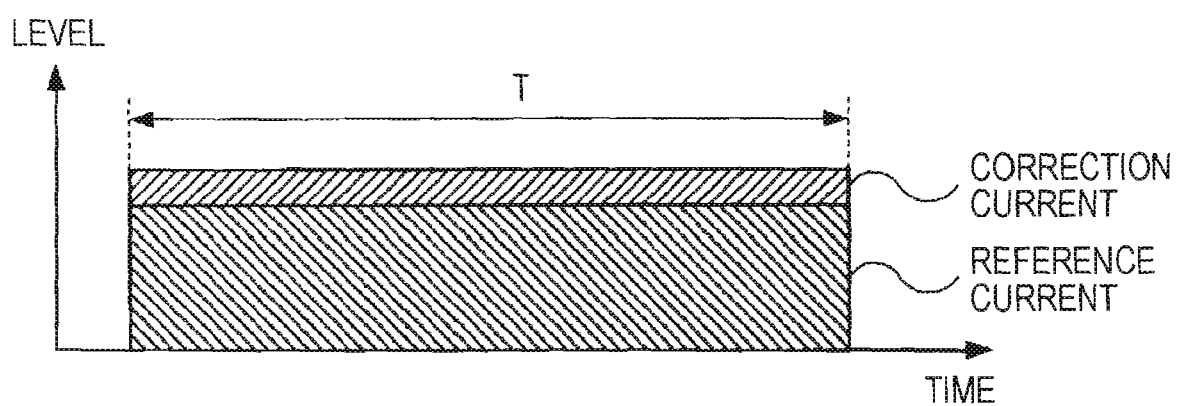
FIG. 11 is a diagram showing the relationship between a reference current and a correction current in the related art.

FIG. 4 shows the relationship among the reference current control signal G1, the correction current control signal G2, and the driving current Ie1. The reference current control signal G1 is active for a first period T1 during which the reference current I1 is output, and the correction current control signal G2 is active for a second period T2 during which the correction current I2 is output. The second period T2 is determined so as to be a portion of the first period T1. In this case, the second period T2 is shorter than the first period T1. In the structure shown in FIG. 2, the amount of light emitted from the OLED element Pi is determined by the current-time product of the driving current Ie1 shown in FIG. 4. A case where the current-time product of the driving current Ie1 shown in FIG. 4 is equivalent to that of the related art shown in FIG. 11 is now considered. In this case, the time period during which the correction current I2 is supplied in FIG. 4 is shorter than the time period during which the correction current is supplied in FIG. 11. Therefore, if the value of the reference current I1 is the same as that of the correction current of the related art, the value of the correction current I2 shown in FIG. 4 needs to be larger than that of the correction current shown in FIG. 11. Since the correction current I2 does not need to be smaller than the correction current of the related art, the correction current I2 can be generated with higher accuracy. In order to generate the correction current I2 whose magnitude is small, the L dimension of the transistors 51 to 54 needs to increase, resulting in increased space occupied by the transistors 51 to 54 and increased circuit size. In contrast, this embodiment allows the magnitude of the correction current I2 to increase. Therefore, the space occupied by the transistors 51 to 54 can be reduced, and the circuit size can also be reduced.

Figure 5:
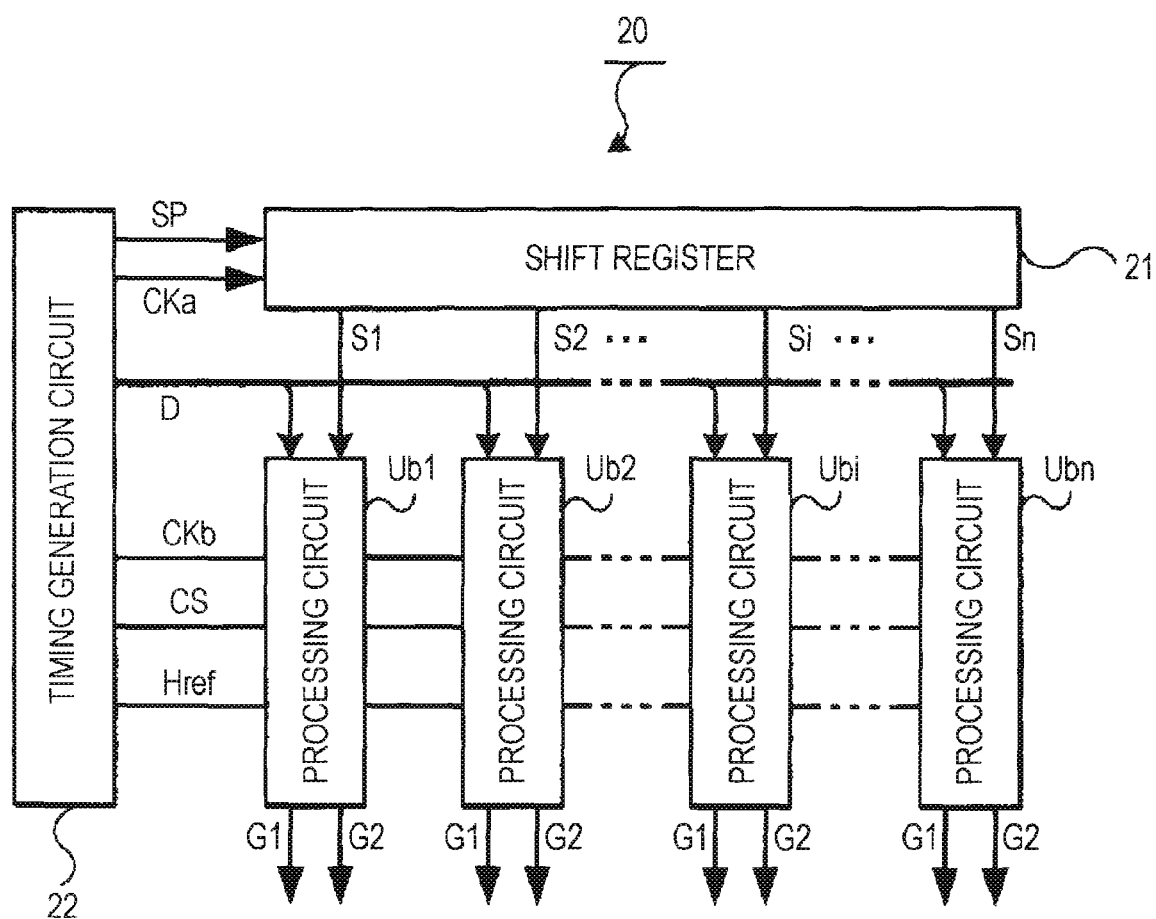
FIG. 5 is a block diagram showing the structure of a control circuit 20.

The structure of the control circuit 20 will be described in detail. As shown in FIG. 5, the control circuit 20 includes n processing circuits Ub1 to Ubn, a shift register 21, and a timing generation circuit 22. The timing generation circuit 22 generates gradation data D indicating the gradation to be displayed by the OLED elements P1 to Pn, and various timing signals. The shift register 21 sequentially shifts a start pulse SP according to a clock signal CKa, and generates latch signals S1 to Sn that are exclusively rendered active.

Figure 6:
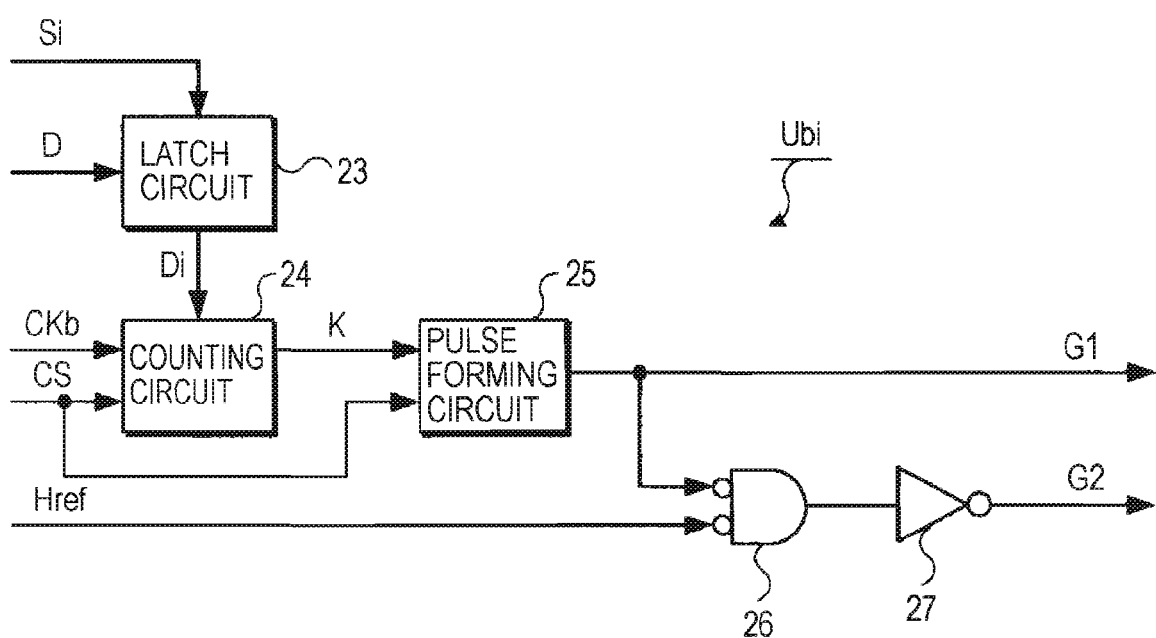
FIG. 6 is a block diagram showing the structure of a processing circuit Ubi.

FIG. 6 shows the structure of the i-th processing circuit Ubi. The other processing circuits are configured in a similar manner. The processing circuit Ubi includes a latch circuit 23, a counting circuit 24, a pulse forming circuit 25, a NOR circuit 26, and an inverter 27. When the latch signal Si is rendered active, the latch circuit 23 captures the gradation data D and holds gradation data Di corresponding to the OLED element Pi. The counting circuit 24 starts counting of a clock signal CKb when a count start signal CS is rendered active, and outputs a carry signal K when the count value coincides with the gradation data Di. The pulse forming circuit 25 is formed of, for example, a clock-synchronization-type set-reset (SR) flip-flop whose set terminal is supplied with the count start signal CS and whose reset terminal is supplied with the carry signal K. The counting circuit 24 and the pulse forming circuit 25 are used to generate a reference current control signal G1 having a pulse width corresponding to the data value of the gradation data Di. The NOR circuit 26 has terminals, one of which is supplied with the reference current control signal G1 and the other of which is supplied with a correction reference signal Href. The NOR circuit 26 calculates the inverse of the logical sum (active-low logical product), and the result is inverted by the inverter 27 to generate a correction current control signal G2.

Figure 7:
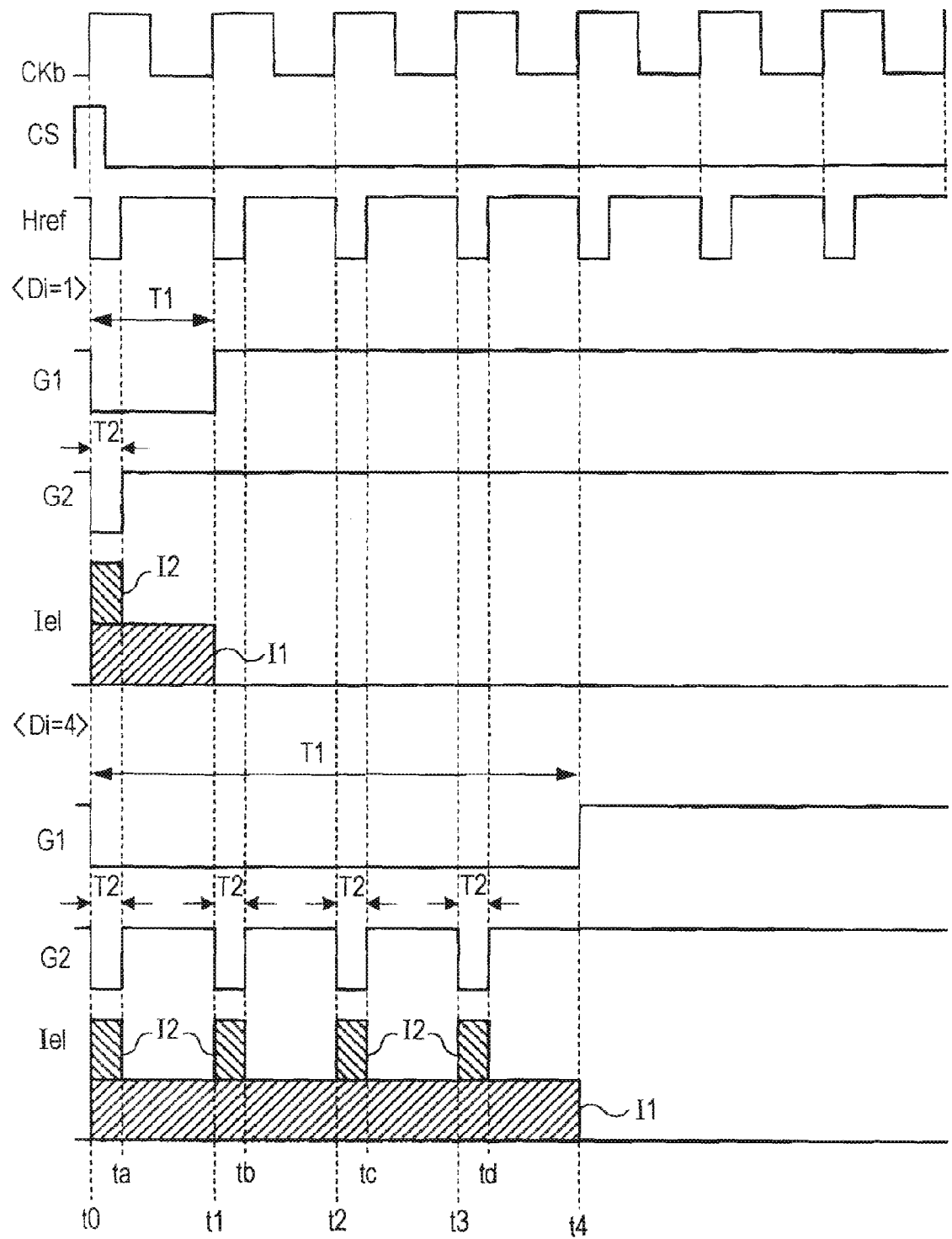
FIG. 7 is a timing chart showing an example of the operation of the processing circuit Ubi.

FIG. 7 is a timing chart showing an example of the operation of the processing circuit Ubi. As described above, the reference current control signal G1 is generated by counting the clock signal CKb, and the time period corresponding to the least significant bit (LSB) of the gradation data Di is equal to one cycle of the clock signal CKb. In this example, the correction reference signal Href is rendered active in synchronization with a rising edge of the clock signal CKb. In other words, the correction reference signal Href is enabled at intervals of the time period corresponding to the LSB of the gradation data Di. The timing at which the correction reference signal Href is enabled and the timing at which the clock signal CKb rises coincide with each other. Therefore, the timing at which the correction current control signal G2 is enabled coincides with the timing at which the reference current control signal G1 is enabled.

As shown in FIG. 7, in a case where the gradation data Di=1, the reference current control signal G1 is enabled for a first period T1 from time t0 to time t1. On the other hand, the correction current control signal G2 is enabled for a second period T2 from time t0 to time ta. The reference current I1 and the correction current I2 are combined to obtain the driving current Ie1, and the driving current Ie1 is therefore a current in which the correction current I2 is superimposed on the reference current I1. In the embodiment, the correction current control signal G2 is generated separately from the reference current control signal G1, and is used to control the second period T2 during which the correction current I2 is supplied. Since the amount of light emitted from the OLED element Pi is proportional to the area of the driving current Ie1, the magnitude (amplitude) of the correction current I2 can be increased by making the second period T2 shorter than the first period T1. For example, if the lengths of the first and second periods T1 and T2 are in a ratio of 5:1, the magnitude of the correction current I2 can be five times as large as that when the first period T1 is equal to the second period T2. As a result, gradation correction for the OLED element Pi can be performed with high accuracy.

As shown in FIG. 7, in a case where the gradation data Di=4, the reference current control signal G1 is enabled for a first period T1 from time t0 to time t4. On the other hand, the correction current control signal G2 is enabled for second periods T2 from time t0 to time ta, from time t1 to time tb, from time t2 to time tc, and from time t3 to time td. By enabling the correction current I2 for every LSB of the gradation data Di, a linear relationship can be achieved between the gradation value and the amount of correction. That is, the higher the gradation to be displayed, the larger the amount of correction, whereas the lower the gradation to be displayed, the smaller the amount of correction. The amount of correction is variably set according to the gradation to be displayed, thereby providing suitable correction for all gradation levels.

In addition, in the example shown in FIG. 7, the first rising edge of the correction current control signal G2 coincides with the rising edge of the reference current control signal G1. In actual circuit design, a data line having parasitic capacitance or distributed resistance is located between the unit circuit Uai and the OLED element Pi. Such a data line is a capacitive load, as viewed from the unit circuit Uai, resulting in a gentle rising waveform of the driving current Ie1. The second period T2 during which the correction current I2 is enabled begins with the beginning of the first period T1, thus allowing the waveform of the driving current Ie1 to rapidly rise.

Figure 8:
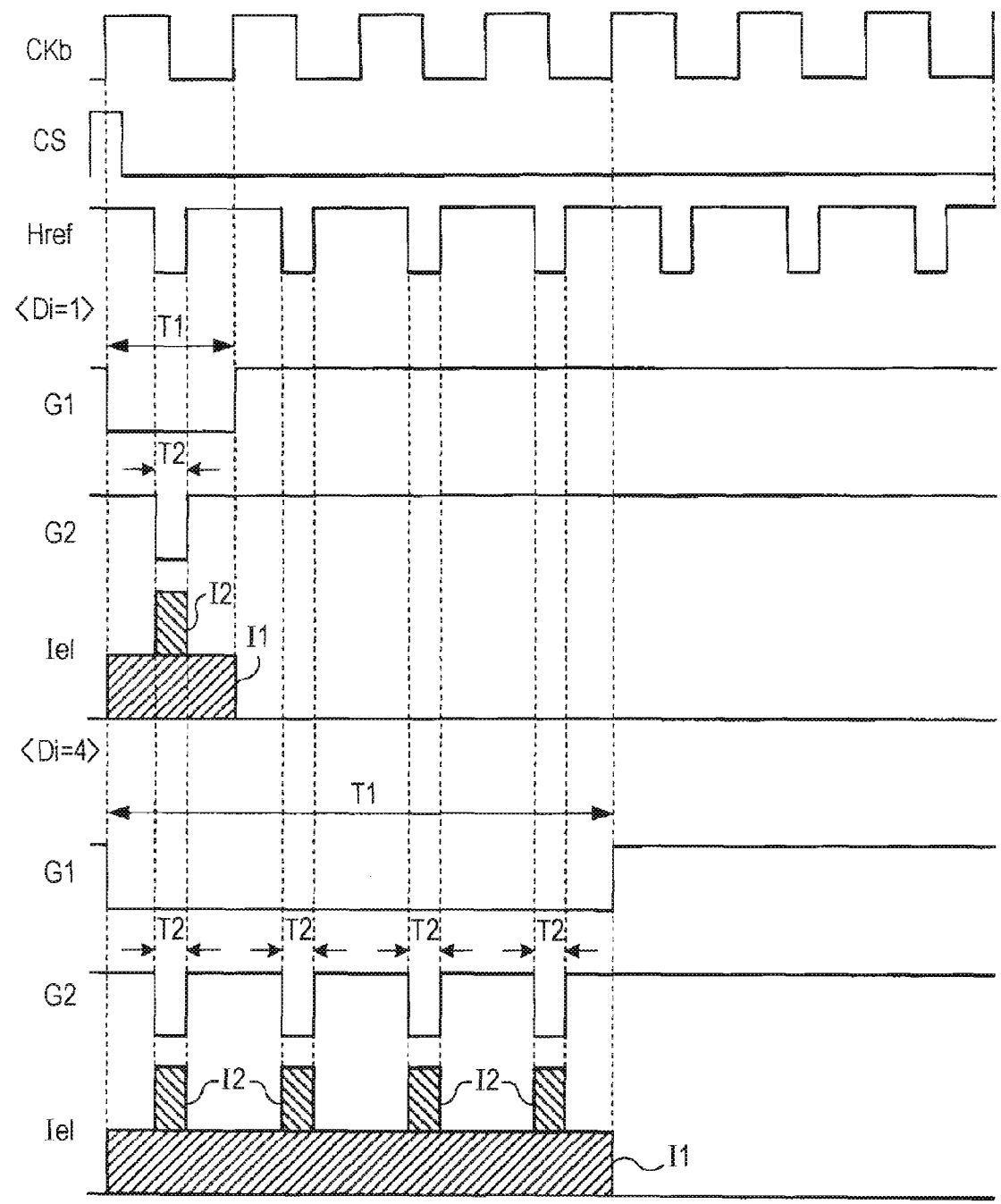
FIG. 8 is a timing chart showing another example of the operation of the processing circuit Ubi.

FIG. 8 shows another example of the operation of the processing circuit Ubi. In this example, the period during which the correction reference signal Href is active is positioned in the center of one cycle of the clock signal CKb. As a result, in a case where the gradation data Di=1, the correction current I2 is superimposed in the middle (second period T2) of the first period T1 during which the reference current I1 is enabled. By designating the second period T2 in this manner, the OLED element Pi can emit stronger light in the middle of the first period T1 during which the OLED element Pi emits light, thus achieving well-balanced light emission.

Modifications

The invention is not limited to the embodiment described above, and various modifications can be made.

(1) In the above-described embodiment, the correction current I2 is variably set according to the reference current I1. However, the invention is not limited thereto, and the correction current I2 may be fixed. For example, in a case where only variations in threshold voltages of the driving transistors 61 are to be corrected, the correction current I2 may be fixed. In this case, the length of the second period T2 may be fixed even if the length of the first period T1 changes according to the gradation.

While the embodiment has been discussed with respect to an example in which the correction current I2 is controlled by four bits the number of bits is not limited to four, and may be one or more. In a case where the correction current I2 is controlled by one bit, the transistors 52 to 54, the memory 60, and the transistors 55 to 58 shown in FIG. 3 can be omitted, and a simple circuit configuration can be achieved.

Furthermore, in the structure shown in FIG. 3 (in which the correction current I2 is controlled by four bits), the memory 60 may be omitted, and the signals corresponding to the bits C0 to C3 of the correction data may be supplied from an external circuit (not shown).

(2) In the above-described embodiment, in a case where the gradation data Di has a data value of 2 or more, the correction current I2 is enabled in a distributed manner a plurality of times within the first period T1 during which the reference current I1 is enabled. However, the invention is not limited thereto, and the correction current I2 may be enabled once, that is, the generation of the correction current I2 may be concentrated in a certain period. Furthermore, the second period T2 may not be a portion of the first period T1, and may be outside the first period T1.

In the above-described embodiment, the first reference voltage Vr1 defining the magnitude of the reference current I1 and the second reference voltage Vr2 defining the magnitude of the correction current I2 may be fixed. However, the second reference voltage Vr2 may be changed according to the gradation to be displayed. Thereby, the correction current I2 whose magnitude corresponds to the gradation can be generated. In this case, it is necessary to generate and supply the second reference voltage Vr2 for each of the unit circuits Ua1 to Uan.

(3) While in the above-described embodiment, the unit circuits Ua1 to Uan output the driving currents Ie1 as drive signals for driving the OLED elements P1 to Pn, the unit circuits Ua1 to Uan may output driving voltages. In this case, a current-to-voltage conversion circuit for converting a current to a voltage may be provided at an output stage of each of the unit circuits Ua1 to Uan. The OLED elements P1 to Pn are current-driven light emitting elements, and each of the OLED elements P1 to Pn may be provided with a pixel circuit, where a driving voltage is be converted into a driving current and the result is supplied to the corresponding OLED element.

(4) In the above-described embodiment, OLED elements have been described as electro-optical elements whose optical characteristics are changed by electrical energy, by way of example. However, the invention is not limited thereto, and light emitting elements, such as field emission display (FED) elements, surface-conduction electron emitter display (SED) elements, and ballistic surface electron emitter display (BSD) elements, and liquid crystal elements may employ the electro-optical elements, Image Forming Apparatus The optical head 1 according to the embodiment described above with reference to FIG. 1 can be used as a line-type optical head for writing a latent image onto an image carrier in an electrophotographic image forming apparatus. Examples of the image forming apparatus include a printer, a printing section in a copying machine, and a printing section in a facsimile machine.

Figure 9:
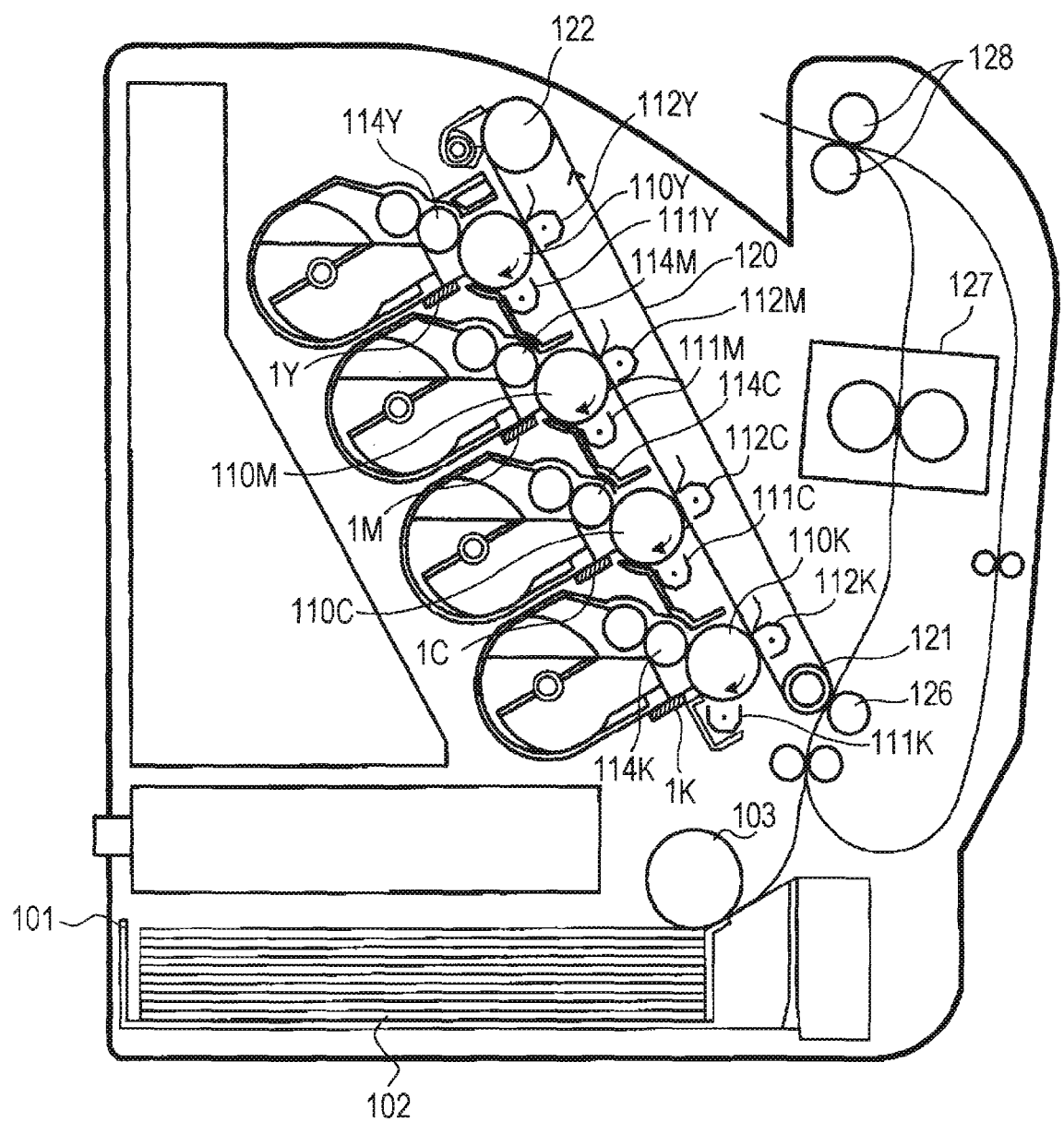
FIG. 9 is a longitudinal cross-sectional view showing the structure of an image forming apparatus including an optical head.

FIG. 9 is a longitudinal cross-sectional view showing an image forming apparatus using the optical head 1. The image forming apparatus shown in FIG. 9 is a tandem full-color image forming apparatus using an intermediate transfer.

In the image forming apparatus shown in FIG. 9, four organic EL array exposure heads 1K, 1C, 1M, and 1Y having a similar structure are arranged at exposure positions of four photorecepter drums (image carrier) 110K, 110C, 110M, and 110Y having a similar structure, respectively. Each of the organic EL array exposure heads 1K, 1C, 1M, and 1Y is implemented by the optical head 1 according to any of the embodiment and modifications described above.

As shown in FIG. 9, the image forming apparatus includes a driving roller 121, a driven roller 122, and an endless intermediate transfer belt 120 trained around the rollers 121 and 122 so as to be rotated around the rollers 121 and 122 in a direction indicated by an arrow. Although not shown, the image forming apparatus may also include tension applying means for applying tension to the intermediate transfer belt 120, such as a tension roller.

The four photorecepter drums 110K, 110C, 110M, and 110Y, each of which has a photorecepter layer on an outer peripheral surface thereof, are arranged around the intermediate transfer belt 120 at predetermined intervals. The subscripts K, C, M, and Y are used to form toner images of black, cyan, magenta, and yellow, respectively. The same applies to the other elements. The photorecepter drums 110K, 110C, 110M, and 110Y are rotated synchronously with the driving of the intermediate transfer belt 120.

Corona charging unit 111K, 111C, 111M, and 111Y the organic EL array exposure heads 1K, 1C, 1M, and 1Y, and developing units 114K, 114C, 114M, and 114Y are disposed around the photorecepter drums 110K, 110C, 110M, and 110Y. The corona charging unit 111K, 111C, 111M, and 111Y uniformly charge the outer peripheral surfaces of the photorecepter drums 110K, 110C, 110M, and 110Y, respectively. The organic EL array exposure heads 1K, 1C, 1M, and 1Y write electrostatic latent images onto the charged outer peripheral surfaces of the photorecepter drums 110K, 110C, 110M, and 110Y, respectively. Each of the organic EL array exposure heads 1K, 1C, 1M, and 1Y is disposed so that the plurality of OLED elements P are arranged along the generatrix (the main scanning direction) of the corresponding photorecepter drum 110 (110K, 110C, 110M, or 110Y). The light from the plurality of OLED elements P is applied to the photorecepter drum 110 (110K, 110C, 110M, or 110Y) to thereby write an electrostatic latent image. The developing units 114K, 114C, 114M, and 114Y deposit toner as developer on the electrostatic latent images to thereby form toner images, i.e., visible images, on the photorecepter drums 110K, 110C, 110M, and 110Y, respectively.

The toner images of black, cyan, magenta, and yellow formed by such four monochromatic imaging systems are sequentially primarily transferred to the intermediate transfer belt 120, and are superimposed on the intermediate transfer belt 120 to form a full-color toner image. Four first transfer corotrons (transfer units) 112K, 112C, 112M, and 112Y are disposed inside the intermediate transfer belt 120. The primary transfer corotrons 112K, 112C, 112M, and 112Y are disposed in the vicinity of the photorecepter drums 110K, 110C, 110M, and 110Y, respectively. The primary transfer corotrons 112K, 112C, 112M, and 112Y electrostatically attract the toner images from the photorecepter drum is 110K, 110C, 110M, and 110Y to thereby transfer the toner images to the intermediate transfer belt 120 passing between the photorecepter drums 110K, 110C, 110M, and 110Y and the primary transfer corotrons 112K, 112C, 112M, and 112Y, respectively.

Sheets 102 on which images are finally formed are fed one-by-one by a pickup roller 103 from a paper feeding cassette 101, and each of the sheets 102 is transported to a nip between the intermediate transfer belt 120 contacting the driving roller 121 and a secondary transfer roller 126. The full-color toner image on the intermediate transfer belt 120 is secondarily transferred in one batch onto one side of the sheet 102 by the secondary transfer roller 126, and are fixed onto the sheet 102 by passing through a fuser roller pair 127 serving as a fuser unit. The sheet 102 is then discharged by a pair of paper ejecting rollers 128 to a paper ejecting cassette placed on the top of the image forming apparatus.

An image forming apparatus according to another embodiment of the invention will be described.

Figure 10:
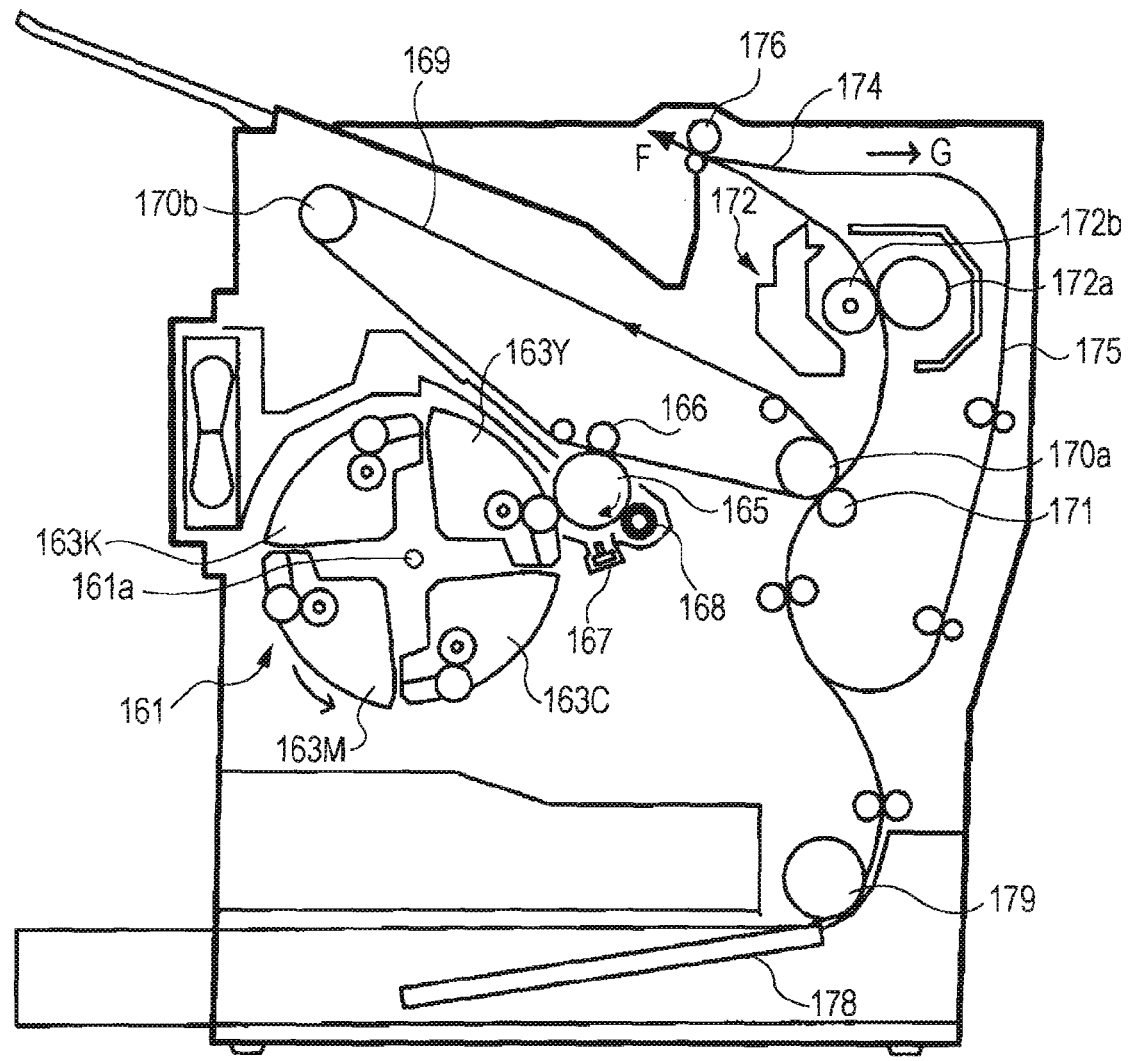
FIG. 10 is a longitudinal cross-sectional view showing the structure of another image forming apparatus including an optical head.

FIG. 10 is a longitudinal cross-sectional view of another image forming apparatus using the optical head 1. The image forming apparatus shown in FIG. 10 is a rotary-developing-type full-color image forming apparatus using a belt-shaped intermediate transfer member. In the image forming apparatus shown in FIG. 10, a corona charging unit 168, a rotary developing device 161, an organic EL array exposure head 167, and an endless intermediate transfer belt 169 are disposed around a photorecepter drum 165.

The corona charging unit 168 uniformly charges an outer peripheral surface of the photorecepter drum 165. The organic EL array exposure head 167 writes an electrostatic latent image onto the charged outer peripheral surface of the photorecepter drum 165. The organic EL array exposure head 167 is implemented by the optical head 1 according to any of the embodiment and modifications described above, and is disposed so that the plurality of OLED elements P are arranged along the generatrix (the main scanning direction) of the photorecepter drum 165. The electrostatic latent image is written by irradiating the photorecepter drum 165 with light from those OLED elements P.

The developing device 161 is a drum including four developing units 163Y, 163C, 163M, and 163K disposed at angular intervals of 90°, and can be rotated counterclockwise around a shaft 161a. The developing units 163Y, 163C, 163M, and 163K supply yellow, cyan, magenta, and black loner to the photorecepter drum 165, respectively, to deposit the toner as developer onto the electrostatic latent image to thereby form, tone images, i.e., visible images, on the photorecepter drum 165.

The endless intermediate transfer belt 169 is trained around a driving roller 170a, a driven roller 170b, a primary transfer roller 166, and a tension roller, and is rotated around those rollers in a direction indicated by an arrow. The primary transfer roller 166 electrostatically attracts the toner images from the photorecepter drum 165 to thereby transfer the toner images to the intermediate transfer belt 169 passing between the photorecepter drum 165 and the primary transfer roller 166.

Specifically, at the first rotation of the photoreceptor drum 165, an electrostatic latent image for a yellow (Y) image is written by the exposure head 167, and a toner image of the same color is formed by the developing unit 163Y and is then transferred to the intermediate transfer belt 169. At the second rotation, an electrostatic latent image for a cyan (C) image is written by the exposure head 167, and a toner image of the same color is formed by the developing unit 163C and is then transferred to the intermediate transfer belt 169 so as to be superimposed on the toner image of yellow. During four rotations of the photoreceptor drum 165, toner images of yellow, cyan, magenta, and black are sequentially superimposed on the intermediate transfer belt 69, and a full-color toner image is thus formed on the intermediate transfer belt 169. In a case where images are formed on both sides of a sheet on which the images are finally formed, toner images of a first color to be formed on the front and back sides of the sheet are transferred to the intermediate transfer belt 169, and toner images of a second color to be formed on the front and back sides of the sheet is then transferred to the intermediate transfer belt 169. In this way, full-color toner images are obtained on the intermediate transfer belt 169.

The image forming apparatus further includes a sheet handling 174 for conveying sheets. The sheets are picked up one-by-one by a pickup roller 179 from a paper feeding cassette 178, and each sheet is conveyed on the sheet handling 174 by a conveying roller to pass through a nip between the intermediate transfer belt 169 contacting the driving roller 170a and a secondary transfer roller 171. The secondary transfer roller 171 electrostatically attracts a full-color toner image in one batch from the intermediate transfer belt 169 to thereby transfer the toner image onto one side of the sheet. A clutch (not shown) allows the secondary transfer roller 171 to approach and recede from the intermediate transfer belt 169. The secondary transfer roller 171 is brought into contact with the intermediate transfer belt 169 when a full-color toner image is transferred onto a sheet, and is separated from the intermediate transfer belt 169 when toner images are superimposed on the intermediate transfer belt 169.

The sheet onto which an image has been transferred in the manner described above is conveyed to a fuser unit 172, and is passed between a heating roller 172a and a pressure roller 172b of the fuser unit 172 so that the toner images on the sheet are fixed. The sheet subjected to the fixing operation is inserted into a paper ejecting roller pair 176, and is advanced in a direction indicated by an arrow F. In the case of double-sided printing, the paper ejecting roller pair 176 is rotated in a reverse direction after a majority of the sheet has been fed though the paper ejecting roller pair 176 so that the sheet can be introduced into a double-sided-printing sheet handling path 175 in a direction indicated by an arrow G. Then, the toner image is transferred onto the other side of the sheet by the secondary transfer roller 171, and is then fixed again by the fuser unit 172. Thus, the resulting sheet is discharged by the paper ejecting roller pair 176.

The image forming apparatuses shown in FIGS. 9 and 10 use the OLED elements P as exposing means, and can therefore be reduced in size compared with image forming apparatuses using a laser scanning optical system. The disclosed optical head can also be used in electrophotographic image forming apparatuses other than those described above. The disclosed optical head can be used in, for example, image forming apparatuses of the type in which a toner image is transferred onto a sheet directly from a photoreceptor drum without using an intermediate transfer belt, and image forming apparatuses for forming monochrome images.

The disclosed optical head can also be used in various electronic apparatuses. Such electronic apparatuses include facsimile machines, copying machines, multifunction machines, and printers.

In addition, the disclosed electro-optical device can also be used as a display device. Examples of electronic apparatuses including such a display device include personal computers, lighting apparatuses with display function, mobile phones, game consoles, electronic papers, video cameras, digital still cameras, car navigation systems, car stereo systems, driver control panels, video players, pagers, electronic notebooks, electronic calculators, and word processors.

What is claimed is:

1. An electro-optical device comprising:
   a controller that generates (i) a reference current control signal defining a first period during which a reference current is output, and (ii) a correction current control signal defining a second period during which a correction current is output, the second period being shorter than the first period;
   a reference current source that generates the reference current based on the reference current control signal;
   a correction current source that generates the correction current based on the correction current control signal;
   a combining unit that combines the reference current and the correction current to generate a driving current; and
   an electro-optical element that emits an amount of light corresponding to the driving current.

2. The electro-optical device according to claim 1, the controller (i) performing gradation control on the electro-optical element on the basis of pulse-width modulation, and (ii) generating the reference current control signal so that the first period has a length corresponding to a pulse width in the pulse-width modulation.

3. The electro-optical device according to claim 2, gradation data that indicates the amount of light emitted from the electro-optical element being formed of a plurality of bits, and
   the controller including:
      a correction reference signal generator that generates a correction reference signal that is enabled at intervals of a time period corresponding to a least significant bit of the gradation data, and
      a logical circuit that determines a logical product of the correction reference signal and the reference current control signal and that outputs the determined logical product as the correction current control signal.

4. The electro-optical device according to claim 1, the correction current source including a digital-to-analog converter that performs digital-to-analog conversion on correction data indicating a magnitude of the correction current to generate the correction current.

5. The electro-optical device according to claim 4, the correction current source further including a storage unit that stores the correction data, and
   the correction data being read from the storage unit and subjected to digital-to-analog conversion to generate the correction current.

6. The electro-optical device according to claim 1, the controller generating the reference current control signal and the correction current control signal so that the second period is included once or a plurality of times within the first period.

7. The electro-optical device according to claim 1, the controller adjusting a length of the second period according to a length of the first period.

8. The electro-optical device according to claim 1, the magnitude of the correction current being determined according to a length of the first period.

9. The electro-optical device according to claim 1, a timing at which the correction current starts to be supplied to the electro-optical element coinciding with a timing at which the reference current starts to be supplied to the electro-optical element.

10. The electro-optical device according to claim 1, a timing of a center of a period during which the correction current is supplied to the electro-optical element coinciding with a timing of a center of a period during which the reference current is supplied.

11. An electronic apparatus comprising the electro-optical device according to claim 1.

12. A method for driving an electro-optical element that emits an amount of light corresponding to a driving current, the method comprising:
   generating a reference current control signal defining a first period during which a reference current is output and a correction current control signal defining a second period during which a correction current is output so that the second period is included within the first period;
   generating the reference current based on the reference current control signal;
   generating the correction current based on the correction current control signal;
   combining the reference current and the correction current to generate the driving current; and
   supplying the driving current to the electro-optical element.

13. An electro-optical device comprising:
   a light-emitting element;
   a unit circuit corresponding to the light-emitting element;
   a control circuit that generates (i) a reference current control signal defining a first period during which a reference current is output, and (ii) a correction current control signal defining a second period during which a correction current is output, the control circuit outputting the reference current control signal and the correction current control signal to the unit circuit;
   the unit circuit combining the reference current and the correction current to drive the light-emitting element.

14. The electro-optical device according to claim 13, further comprising a timing generating circuit that generates gradation data to be displayed by the light-emitting element.

15. The electro-optical device according to claim 13, further comprising a voltage generation circuit that generates a power supply voltage, a first reference voltage, and a second reference voltage, the voltage generation circuit supplying the power supply voltage, first reference voltage, and second reference voltage to the unit circuit, the magnitude of the reference current being determined by the first reference voltage and the magnitude of the correction current being determined by the second reference voltage.

* * * * *